April 12, 1927.	O. OLSON	1,624,278

AXLE ATTACHMENT

Filed March 8, 1926

Inventor

O. Olson

Patented Apr. 12, 1927.

1,624,278

UNITED STATES PATENT OFFICE.

OSCAR OLSON, OF BOYCEVILLE, WISCONSIN.

AXLE ATTACHMENT.

Application filed March 8, 1926. Serial No. 93,139.

The invention relates to axle extensions for wagons and other vehicles whereby the wheels may be placed at greater distances apart for preventing tilting of the wagon under certain types of loads, and for other purposes, and has for its object to provide a device of this character comprising an extension skein provided with a casing at its inner end having its upper side open, and in which casing the axle skein of the wagon is received, and to provide a filler block in the open end of the casing, which block is securely clamped to the axle skein by U bolts encircling the casing and connected to the filler block, thereby securely clamping the extension skein in axial relation to the axle skein.

A further object is to connect a tie rod to one of the U-shaped bolts, and by means of which tie rod the extension skein is further tied and held rigidly in position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
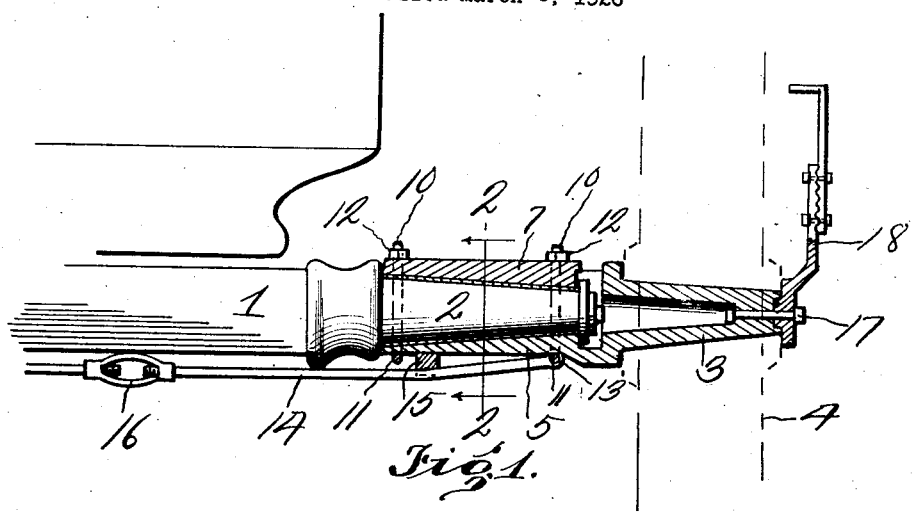
Figure 1 is a vertical longitudinal sectional view through the extension skein showing the same applied to a conventional form of axle skein.
Figure 2:
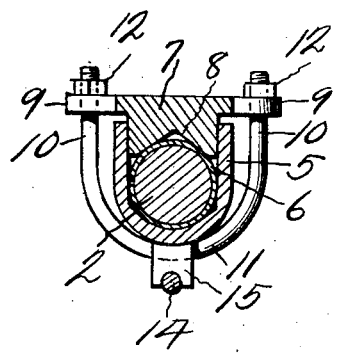
Figure 2 is a vertical transverse sectional view taken on line 2—2 of Figure 1.
Figure 3:
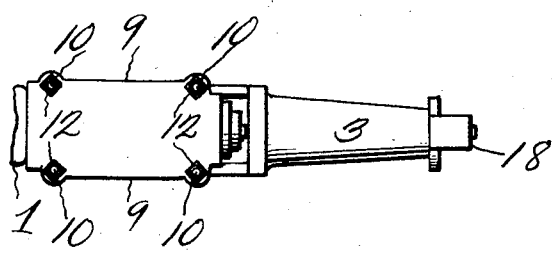
Figure 3 is a top plan view of the extension skein.

Referring to the drawing the numeral 1 designates a conventional form of wagon axle and 2 the skein thereof, on which the wagon wheel rotates in the usual manner. It has been found that the distance between the wheels of a conventional form of wagon is at times not sufficient to prevent tilting of the wagon, especially when carrying loads of hay over relatively rough ground, and to obviate this difficulty the extension skein 3 is provided, and on which extension skein the wheel 4 is placed after being removed from the axle skein 2. Only one extension skein is shown and described, however it is to be understood that a similar skein is to be applied to the other end of the axle. The extension skein 3 is provided with an inwardly extending casing 5, which is U-shaped in vertical transverse cross section as shown in Figure 2, and in which casing 5, through the open upper end thereof is placed the axle skein 2, preferably after a split contractible sleeve 6 is placed on the skein 2, for forming a gripping member for additionally holding the device on the axle skein. Disposed within the open upper side of the casing 5 is a tapered block 7, which is provided with a longitudinally disposed V-shaped recess 8, in which recess the upper side of the sleeve 6 is received, therefore it will be seen that when the block 7 is forced downwardly the axle skein 2 will be securely clamped within the casing 5. Block 7 is provided with outwardly extending flanges 9, through which the arms 10 of the U-shaped clamping bolts extend, and it will be seen when the nuts 12 are tightened, the tapered block 7 will be forced into clamping engagement with the split sleeve 6. The U-shaped bolts arch the under side of the casing 5, and the outer U-shaped bolt has connected thereto at 13, a tie rod 14, which extends over a spacing block 15, and is provided with a turn buckle 16. By adjusting the turn buckle 16, it will be seen that the extension skein may be additionally braced and connected to the axle skein 2. Connected to the outer end of the extension skein 3 by means of a bolt 17 is an upwardly extending adjustable arm 18, which serves as a wheel retainer and as the height adjusting arm.

From the above it will be seen that an extension skein is provided for wagon axles, which skein is simple in construction, may be easily and quickly applied, will not jamb on the axle skein in a manner whereby it can not be easily removed, and constructed in a manner whereby through the medium of a contractible split sleeve the axle skein will not be marred or damaged.

The invention having been set forth what is claimed as new and useful is:—

1. An extension skein for an axle skein, said extension skein being disposed in axial relation to the axle skein, an inwardly extending integral casing carried by the extension skein and having a longitudinally disposed chamber extending inwardly from one side thereof and in which the axle skein is received through the side of the extension casing, a tapered clamping block disposed in the casing chamber and engaging the upper side of the axle skein, U-shaped bolts arching the casing, the arms of said U-shaped bolts being connected to the block at opposite sides of the casing.

2. An extension skein for an axle skein, said extension skein comprising a skein in axial relation to the axle skein, an inwardly extending casing U-shaped in vertical transverse cross section carried by the extension skein and having a chamber extending inwardly from one side thereof and in which chamber the axle casing is disposed, a contractable sleeve carried by the axle skein, a wedge shaped clamping block engaging the side of the contractable sleeve within the chamber, and U-shaped bolts arching the casing and connected to the block.

In testimony whereof I hereunto affix my signature.

OSCAR OLSON.